3,115,492
PROCESS FOR THE PRODUCTION OF
6-FLUORO STEROIDS
Albert Bowers and Howard J. Ringold, Mexico City, Mexico, assignors, by mesne assignments, to Syntex Corporation, a corporation of Panama
No Drawing. Filed May 4, 1960, Ser. No. 26,703
Claims priority, application Mexico July 10, 1959
14 Claims. (Cl. 260—239.55)

The present invention relates to a novel process for the production of cyclopentanophenanthrene derivatives.

More particularly the present invention relates to a novel process for the production of 5α-hydroxy-6β-fluoropregnanes, which are valuable intermediates for the production of the important 6α-fluoro steroidal hormones.

A prior method for the fluorination at C–6 of the steroidal hormones which utilized anhydrous hydrogen fluoride had great disadvantages in view of the extreme difficulty in handling the anhydrous hydrogen fluoride, low yields and secondary reactions. Ringold, Bowers, Mancera and Rosenkranz discovered that the use of boron trifluoride was a decided improvement and an excellent reagent to effectuate the fluorination at C–6 as is set forth in their copending application Serial No. 753,629, filed on August 7, 1958.

In accordance with the present invention there has been discovered a novel process for the production of the 6-fluoro steroids in high yields. In particular, there has been discovered that the use of fluoroboric acid in the presence or absence of boron trifluoride is even a better reagent for the conversion of a steroidal 5α,6α-epoxide into the 5α-hydroxy-6β-fluoro derivative. The prior art methods afforded the desired product in low yields; thus, when anhydrous hydrogen fluoride was utilized, most of the starting material was recovered, whereas, when boron trifluoride etherate was utilized, yields of about 40% of the desired product were obtained. However, the novel method of the present invention surprisingly resulted in the desired fluorohydrin being produced in yields of up to 81%. Although boron trifluoride has been suggested as a catalyst in conjunction with hydrogen fluoride in the opening of 5α,6α-oxido rings, it was noted that this method (i.e. anhydrous hydrogen fluoride and catalytic amounts of boron trifluoride) gave the desired product in yields of only about 20%.

The novel fluorinating agent of the present invention is obtained by mixing anhydrous hydrogen fluoride with an excess of boron trifluoride etherate at low temperature. The ratio of hydrogen fluoride to boron trifluoride etherate may range, on a molar basis, from 80:20 to 25:75, the preferred ratio being about 50:50.

The fluorination of a steroidal 5α,6α-oxido-pregnane proceeds in accordance with the following schematic diagram:

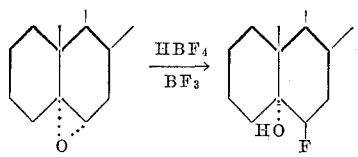

In practicing the novel process, the epoxide is treated in equal parts of benzene and ether solution with the novel fluorinating agent at room temperature for about 3 hours or up to 6 hours. Thus there can be prepared valuable 6β-fluoro-5α-hydroxy pregnanes as hereinafter is more fully set forth.

In this manner, 6β-fluoro-pregnane-3β,5α-diol-20-one-3 - acetate, 6β-fluoro-pregnane-3β,5α,17α,21-tetrol-20-one 21-acetate or the 17,21-diacetate thereof; 6β-fluoro-3-ethylenedioxy-pregnane-5α,17α,21-triol-11,20-dione-21-monoacetate or the 17,21-diacetate; the 16,21-diacetate of 6β,9α-difluoro-3-ethylenedioxy-pregnane - 5α,11β,16α,17α,21-pentol-20-one; the 17-acetate of 16α-methyl-6β-fluoro-Δ$^{9(11)}$-pregnene-3β,5α,17α-triol-20-one; or 16α-methyl-6β-fluoro-Δ$^{9(11)}$-pregnene-3β,5α,17α-triol-20-one are prepared from the corresponding 5α,6α-oxido-compounds. The latter are produced from the corresponding known Δ$^5$-compounds by the conventional peracid oxidation. The starting 16α-methyl-Δ$^{5,9(11)}$-pregnadiene-3β,17α - diol - 20-one is disclosed in copending application Serial No. 10,533, filed February 24, 1960.

The thus formed 5α-hydroxy-6β-fluoro pregnanes are valuable intermediates for the preparation of 6α-fluoro cortical hormones. The 6β-fluoro-pregnane-3β,5α-diol-20-one 3-acetate obtained from the acetate of 5α,6α-oxido-pregnan-3β-ol-20-one can be converted into the important 6α-fluoro-hydrocortisone by introducing hydroxyl groups at C–17α and C–21 by conventional methods, followed by formation of the Δ$^4$-3-keto grouping with inversion of the steric configuration at C–6 by known methods and incubation with bovine adrenal glands to effect introduction of a hydroxyl group at C–11 in β-configuration.

In a similar manner, the 17,21-diacetate or 21-acetate of 6β-fluoro-3-ethylenedioxy-pregnane-5α,17α,21-triol-11,20-dione is transformed into the diacetate or 21-monoacetate of 6α-fluoro cortisone by hydrolyzing the ketal group, dehydrating at C–5 and inverting the steric configuration at C–6 as by treatment with dry hydrogen chloride in glacial acetic acid.

Similarly, the 16,21-diacetate of 6β,9α-difluoro-3-ethylenedioxy-pregnane-5α,11β,16α,17α,21-pentol - 20 - one is transformed into the 16,21-diacetate of 6α,9α-difluoro-hydrocortisone.

By oxidation of the 3β-hydroxyl group of 16α-methyl-6β-fluoro-Δ$^{9(11)}$-pregnene-3β,5α,17α - triol - 20 - one to the keto group, followed by dehydration at C–5 and inversion of the steric configuration at C–6, there was obtained the 16α-methyl-6α-fluoro-Δ$^{4,9(11)}$-pregnadien - 17α - ol - 3,20-dione. The 9,11-double bond is then transformed into the 9α-halo(chlorine, bromine or fluorine)-11β-hydroxyl grouping by the method of Fried et al., J. Am. Chem. Soc., 79, 1130 (1957). The subsequent introduction of the 21-acetoxy group may be carried out by monoiodination at C–21 followed by acetolysis as disclosed by Stork et al. in U.S. Patent No. 2,874,154.

The novel process of the present invention may also be used for the production of 5α-hydroxy-6β-fluoro-androstanes which are intermediates for the production of valuable 6α-fluoro steroids of the androstane series. Thus, 5α,6α-oxido-androstane-3β,17β-diol; 17α-methyl-5α,6α-oxido-androstane-3β,17β-diol; 17α-ethinyl-5α,6α-oxido-androstane-3β,17β-diol; 5α,6α-oxido-androstan-3β-ol-17-one are converted into the corresponding 6β-fluoro-5α-hydroxy-androstanes by reaction with the novel fluorinating agent of the present invention.

It is obvious that the reaction sequences described above may be changed or they may be substituted by other known reactions. To those skilled in the art it is obvious the reaction conditions may be modified within wide limits. The fluoroboric acid may be employed in lesser quantities than those described and/or instead of the benzene-ether mixture, there may be employed other solvents inert to this reaction such as aliphatic or aromatic hydrocarbons (toluene, xylene, nitrobenzene and the like) either alone or in mixture with ethyl ether, dioxane or tetrahydrofurane. Although the fluorination is preferably effected at room temperature, it may also be conducted at lower temperatures. If benzene is employed as the sole solvent, the reaction may be completed in a few minutes.

The following specific examples serve to illustrate but are not intended to limit the present invention.

PREPARATION OF FLUOROBORIC ACID (HBF$_4$)

2.8 cc. of boron trifluoride etherate was slowly added with stirring to 220 mg. of anhydrous hydrogen fluoride cooled in an acetone-dry ice bath. There was thus obtained the reagent which was used in the transformations described in the following examples. The reagent already contains the boron trifluoride etherate since it was used in excess; however the quantity of boron trifluoride can be diminished to the point of complete elimination. In order to obtain a reagent consisting exclusively of fluoroboric acid if there is employed a smaller amount of boron trifluoride etherate. However, the reaction proceeds with better result if the reagent is prepared as described above.

Example I

To a solution of 7.5 g. of the acetate of 5α,6α-oxido-pregnane-3β-ol-20-one in 700 cc. of a mixture of equal parts of benzene and ether was added 10 cc. of the reagent prepared in accordance with the preceding preparation. The mixture was kept for 3 hours at room temperature, then washed four times with 250 cc. portions of water, dried over anhydrous sodium sulfate and the solvent was evaporated by distillation, finally under reduced pressure. The residue was purified by recrystallization from acetone-hexane, thus yielding the 3-acetate of 6β-fluoro-pregnane-3β,5α-diol-20-one (M.P. 225°–227°) in a yield of 81%.

Example II 2 grams of 5α,6α-oxido-pregnan-3β,17α-diol-20-one 17-monoacetate in 200 cc. of benzene-ether solution (1:1) was treated with 2 cc. of a mixture of hydrogen fluoride: boron trifluoride etherate (50:50 on molar basis) at room temperature for 6 hours. The mixture was worked up in the same manner as described in Example I to afford the desired 6β-fluoro-pregnan-3β,5α,17α-triol-20-one 17-monoacetate in a yield of 75%.

Example III

By substituting a mixture of hydrogen fluoride:boron trifluoride etherate in a molar ratio of 40 to 60 in the previous example, the desired product was obtained in 60% yield.

Example IV

In accordance with the method described in Example I except that a mixture of hydrogen fluoride:boron trifluoride etherate in a molar ratio of 80:20 was employed, there was obtained the same product in 61% yield.

Example V

By substituting in the methods of the previous examples a mixture of the fluorinating agent in a ratio of 25:75 on a molar basis of the hydrogen fluoride to boron trifluoride etherate, the desired fluorohydrin was obtained in a yield of 63%.

Example VI

To illustrate the use of hydrogen fluoride with a catalytic amount of boron trifluoride, there was substituted in the method of Example II, a mixture of hydrogen fluoride:boron trifluoride etherate in a molar ratio of 95 to 5, with the result that the desired fluorohydrin was obtained in only 20% yield.

Example VII

In accordance with the method of Example II except that anhydrous hydrogen fluoride was used instead of the novel fluorinating agent of the present invention, 95% of the starting material was recovered after working up the reaction mixture as described in that example.

Example VIII

By following the method of Example I, the 17,21-diacetate of 5α,6α-oxido-pregnan-3β,17α,21-triol-20-one was converted into the 17,21-diacetate of 6β-fluoro-pregnan-3β,5α,17α,21-tetrol-20-one; the diacetate of 3-ethylenedioxy-5α,6α-oxido-pregnane-17α,21-diol-11,20-dione afforded the 17,21-diacetate of 6β-fluoro-3-ethylenedioxy-pregnane-5α,17α,21-triol-11,20-dione; from the 16α,21-diacetate of 3-ethylenedioxy-5α,6α-oxido - 9α - fluoro-pregnane-11β,16α,17α,21-tetrol-20-one there was obtained the 16,21-diacetate of 3-ethylenedioxy-6β,9α-difluoro-pregnan-5α,11β,16α,17α,21-pentol-20-one; the 17-acetate of 16α-methyl-5α,6α-oxido-Δ$^{9(11)}$-pregnene-3β,17α-diol-20-one was converted into the 17-acetate of 16α-methyl-6β-fluoro-Δ$^{9(11)}$-pregnene-3β,5α,17α-triol-20-one; from 16α-methyl-5α,6α-oxido-Δ$^{9(11)}$-pregnene-3β,17α-diol-20-one there was obtained 16α-methyl-6β-fluoro-Δ$^{9(11)}$-pregnene-3β,5α,17α-triol-20-one; from the 21-acetate of 5α,6α-oxido-pregnane-3β,11β,17α,21-tetrol-20-one there was obtained the 21-acetate of 6β-fluoro-pregnane-3β,5α,11β,17α,21-pentol-20-one; and from the 21-acetate of 16α-methyl-5α,6α-oxido-pregnane-3β,17α,21-triol-20-one there was obtained the 21-acetate of 16α-methyl-6β-fluoro-pregnane-3β,5α,17α,21-tetrol-20-one.

We claim:

1. A process for the production of 6-fluoro steroids of the pregnane series comprising reacting a 5α,6α-oxido-pregnane with fluoroboric acid to form the corresponding 5α-hydroxy-6β-fluoro-pregnane compound.
2. The process of claim 1 wherein the fluoroboric acid consists of a mixture of anhydrous hydrogen fluoride and boron trifluoride etherate in a molar ratio ranging from 80:20 to 25:75.
3. The process of claim 2 wherein the molar ratio is 80:20.
4. The process of claim 2 wherein the molar ratio is 40:60.
5. The process of claim 2 wherein the molar ratio is 50:50.
6. The process of claim 2 wherein the molar ratio is 25:75.
7. In a process for the production of 6-fluoro steroids of the pregnane series the step comprising reacting a 5α,6α-oxido-pregnane with fluoroboric acid in an inert solvent.
8. In a process for the production of 6-fluoro steroids of the pregnane series the step comprising reacting a 5α,6α-oxido-pregnane with fluoroboric acid in an inert solvent for at least three hours.
9. The process of claim 7 wherein the fluoroboric acid consists of a mixture of anhydrous hydrogen fluoride and boron trifluoride etherate in a molar ratio ranging from 80:20 to 25:75.
10. The process of claim 9 wherein the molar ratio is 50:50.
11. The process of claim 8 wherein the fluoroboric acid consists of a mixture of anhydrous hydrogen fluoride and boron trifluoride etherate in a molar ranging from 80:20 to 25:75.
12. The process of claim 11 wherein the molar ratio is 50:50.
13. The process of claim 7 wherein the inert solvent is a 1:1 mixture of benzene and ether.
14. The process of claim 12 wherein the inert solvent is a 1:1 mixture of benzene and ether.

References Cited in the file of this patent

UNITED STATES PATENTS

| | | |
|---|---|---|
| 2,838,492 | Pederson et al. | June 10, 1958 |
| 2,951,840 | Ringold et al. | Sept. 6, 1960 |